US007796993B2

(12) United States Patent
Kim et al.

(10) Patent No.: US 7,796,993 B2
(45) Date of Patent: Sep. 14, 2010

(54) METHOD FOR PROVIDING LOCATION VALUE OF TARGET TERMINAL IN LOCATION INFORMATION PROVIDING SYSTEM

(75) Inventors: Joo-Young Kim, Suwon-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 11/759,592

(22) Filed: Jun. 7, 2007

(65) Prior Publication Data

US 2007/0287411 A1   Dec. 13, 2007

(30) Foreign Application Priority Data

Jun. 9, 2006   (KR)   ................ 10-2006-0052234

(51) Int. Cl.
*H04W 36/00*   (2009.01)
(52) U.S. Cl. ............... 455/436; 455/418; 455/432.1; 455/456.3; 340/539.13
(58) Field of Classification Search ............ 370/331; 455/422.1, 436, 456.1, 456.3
See application file for complete search history.

(56) References Cited

U.S. PATENT DOCUMENTS

2005/0118999 A1 * 6/2005 Zhu ................... 455/432.1

2006/0099961 A1   5/2006 Duan
2007/0182547 A1 * 8/2007 Wachter et al. ......... 340/539.13
2010/0062752 A1 * 3/2010 Shim ..................... 455/418

FOREIGN PATENT DOCUMENTS

WO   2006/031022 A   3/2006

OTHER PUBLICATIONS

Open Mobile Alliance Ltd., "Secure User Plane Location Architecture", Candidate Version 1.0-Jul. 19, 2005, Open Mobile Alliance OMA-AD-SUPL-V1 0-20050719-C : XP002410620, 2005, pp. 1-80.
Qualcomm, "Addition of Periodic Location Procedures", XP-002410621, 3GPP TSG-SA WG2 Meeting # 47, Montreal, Canadation, Jun. 27, 2005, pp. 1-26.

* cited by examiner

*Primary Examiner*—Kent Chang
*Assistant Examiner*—Dinh P Nguyen
(74) *Attorney, Agent, or Firm*—Jefferson IP Law, LLP

(57) ABSTRACT

A method for providing a location value of a Target (SET) in a location information providing system is provided, wherein an Home Secure User Plane Location (SUPL) Location Platform (H-SLP) also checks a period for a positioning and it transmits a positioning start inducing message to the Target SET if an Secure User Plane Location (SUPL) TRIGGERED START message does not arrive from the Target SET within a specific time interval from a beginning of the corresponding period. Therefore, there is a complementary effect on that the positioning can be performed in the preset period.

23 Claims, 8 Drawing Sheets

METHOD FOR PROVIDING LOCATION VALUE OF TARGET TERMINAL IN LOCATION INFORMATION PROVIDING SYSTEM

PRIORITY

This application claims the benefit under 35 U.S.C. §119(a) of a Korean patent application filed in the Korean Industrial Property Office on Jun. 9, 2006 and assigned Serial No. 2006-0052234, the entire disclosure of which is hereby incorporated by reference.

BACKGROUND OF THE INVENTION

1. Field of the Invention

The present invention relates to a system including a location server and a target terminal which provides a triggered location service. More particularly, the present invention relates to a method for providing a location value of the target terminal in a location information providing system.

2. Description of the Related Art

A triggered location service refers to a service for calculating a location value of a target terminal in every specific period or occurring specific criteria and providing a location service agent with the location value. At this time, in order to calculate the location value, a location server and the target terminal exchange a message for the positioning. In this case, one of the location server or the target terminal should transmit the message for starting a connection for the positioning to the other.

FIG. 1 is a flowchart illustrating an operating procedure of calculating a location value of the target terminal according to a conventional method for providing the location service.

Referring to FIG. 1, the operating procedure of calculating the location value of the target terminal according to the conventional method for providing location information is as follows. Hereinafter, the target terminal and the location server will be described on an assumption that they use a Secure User Plane Location (SUPL) protocol.

A. An SUPL AGENT transmits a Mobile Location Protocol Triggered Location Request Report (MLP TLRR) to a Home SUPL Location Platform (H-SLP). The H-SLP examines a triggered location service authority of the SUPL AGENT by using a CLIENT ID and a SUBSCRIBER PRIVACY of the target terminal by using a Mobile Subscriber Identity (MSID).

B. The H-SLP determines if a Target Secure User Plane Location (SUPL) Enabled Terminal (SET)(Target SET) is in a roaming state, and if the Target SET performs the positioning by using the SUPL protocol.

C. The H-SLP transmits a location service initiating message (SUPL INIT message) to the Target SET and starts the triggered location service. At this time, the SUPL INIT message may be sent in a form of a Wireless Application Protocol push (WAP push) or a Short Message Service (SMS) TRIGGER method. And the SUPL INIT message includes parameters such as a SESSION ID indicating a connection between the H-SLP and the Target SET, a TRIGGER-TYPE indicating a kind of the triggered location service, a POS METHOD indicating the positioning method and an SLP mode indicating a form of the H-SLP.

D. If the Target SET receives the SUPL INIT message, it is connected to a data network.

E. The Target SET transmits an SUPL TRIGGERED START message. At this time, the SUPL TRIGGERED START message includes parameters such as the SESSION ID, a Location ID (LID) indicating a location of a network in which the Target SET currently exists, a SET-CAPABILITY indicating the positioning method of the Target SET or the like.

F. The H-SLP transmits the SUPL TRIGGERED START message, determines the positioning method, and transmits criteria for the triggered location service to the Target SET.

G. The H-SLP transmits the MLP Triggered Location Reporting answer (TLRA) message to the SUPL AGENT and reports the start of the requested triggered location service.

H. The Target SET memorizes a period for the positioning and transmits an SUPL Positioning Initiating message (SUPL POS INIT message) for starting the positioning. At this time, the message includes the LID as information on the network in which the Target SET exists.

I. The H-SLP and the Target SET perform the positioning.

J. The H-SLP transmits a location value resulting from the positioning to the SUPL AGENT.

Among those steps, steps H, I and J are repeated during the triggered location service. Accordingly, in the conventional method, the Target SET transmits the message indicating the start of the positioning during the triggered location service to the H-SLP. That is, the Target SET memorizes a period for performing the positioning periodically, and when the period arrives, the Target SET transmits the message for starting the positioning to the H-SLP. And then, if the H-SLP receives the message for starting the positioning session from the Target SET, the positioning procedures is started.

That is, the only Target SET, not the H-SLP checks the period for the positioning. Therefore, the H-SLP waits for the SUPL POS INIT message transmitted from the Target SET, and then starts the positioning after receiving the message. Thus, there is a problem in the conventional method in that if the Target SET misses the period for performing the positioning and fails to transmit the SUPL POS INIT message to the H-SLP, the positioning cannot be started. In such, the location value is not calculated in the corresponding period so that the location service cannot be performed. This corresponds to not only the triggered location service but also a deferred event occurrence service. That is because that the location value is calculated according to a specific period so as to provide the deferred event occurrence service, and the occurrence of the corresponding criteria is determined by using the location value, so that the deferred event occurrence service is in progress.

Accordingly, when the Target SET misses the positioning period due to a turn-on after the power turns off or the predetermined period due to a timer error of the Target SET, the Target SET fails to transmit the SUPL POS INIT message to the H-SLP. Further, in this case, it does not start the positioning so that the location value of the Target SET is not calculated. Therefore, there arises a problem in that an appropriate triggered location service is not provided.

SUMMARY OF THE INVENTION

Accordingly, the present invention has been made to solve the above-mentioned problems and/or disadvantages and to provide at least the advantages described below. Accordingly, an aspect of the present invention is to provide a method for performing a positioning on a corresponding period by a Target SET as well as by an H-SLP through operating a timer. That is, the Target SET and the H-SLP checks the corresponding period together. Therefore, when the Target SET fails to transmit an SUPL POS INIT message to the Target SET, the H-SLP transmits the positioning initiating message to the Target SET, thereby allowing a triggered location service to be successfully provided. Therefore, when the Target SET fails to transmit an SUPL TRIGGERED START message within the corresponding period, the H-SLP transmits the SUPL POS INIT message to the Target SET so that the method for providing a service of the triggered location information provision is provided more reliably.

In accordance with an aspect of the present invention, a method of performing a positioning of a target terminal is provided. The method includes (1) exchanging a location service initiating message (SUPL INIT message) and a triggered location service start message (SUPL TRIGGERED START message) by the location server (H-SLP) and the Target SET, and obtaining a positioning method and criteria for the triggered location service and starting the triggered location service by the Target SET, (2) determining if the H-SLP receives the SUPL INIT message for starting the positioning from the Target SET within a specific period by the H-SLP, (3) transmitting a positioning start inducing message to the Target SET by the H-SLP when the SUPL INIT message does not arrive the Target SET, (4) receiving the positioning start inducing message and transmitting the SUPL INIT START message to the H-SLP by the Target SET, (5) performing the positioning by the H-SLP and the Target SET, and (6) transmitting a location value resulting from the positioning to the SUPL AGENT by the H-SLP.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. The present invention is described with an example of an H-SLP and a Target SET calculate a location value of the Target SET by using an SUPL protocol, however can be, of course, applied to another protocol. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A system for providing location information to provide a location service according to an exemplary embodiment of the present invention includes the following components.

1) A Secure User Plane Location AGENT (SUPL AGENT) 302: The SUPL AGENT 302 requests an H-SLP 304 of a triggered location service with establishing criteria. The criteria include a period interval and a kind of a desired service in providing the triggered location service, e.g., a time-periodic location service, position changing location service or the like.

2) An SUPL Location Platform (SLP) 304: The SLP 304 transmits the triggered location service to the SUPL AGENT 302 with a location value of a Target SET 306 according to a request of the SUPL AGENT 302. The SLP 304 checks a period for starting a positioning during the triggered location service, and then waits for an SUPL POS INIT message from the Target SET 306. If the SUPL POS INIT message does not arrive within a specific time interval from the beginning of the preset period, the SLP 304 transmits the positioning inducing message to the Target SET 306.

However, in case of receiving a request for the triggered location service from the Target SET 306, i.e., a SET INITIATED CASE, the SLP 304 memorizes the corresponding period and determines if it receives the SUPL POS INIT message from the Target SET within the corresponding period. And, if the SUPL POS INIT message does not arrive within the corresponding period, the SLP 304 transmits the positioning inducing message to the Target SET 306.

3) A Target Secure User Plane Location (SUPL) Enabled Terminal (SET)(Target SET) 306: When the Target SET 306 receives the request for the triggered location service from the SLP 304, it stores the corresponding period. And, the Target SET 306 transmits the SUPL POS INIT message to the SLP 304 according to the period. However, the Target SET 306 receives the request for the triggered location service from the SUPL AGENT 302 in the Target SET 306, i.e., the SET INITIATED CASE, it requests the SLP 304 of the triggered location service.

Figure 1:
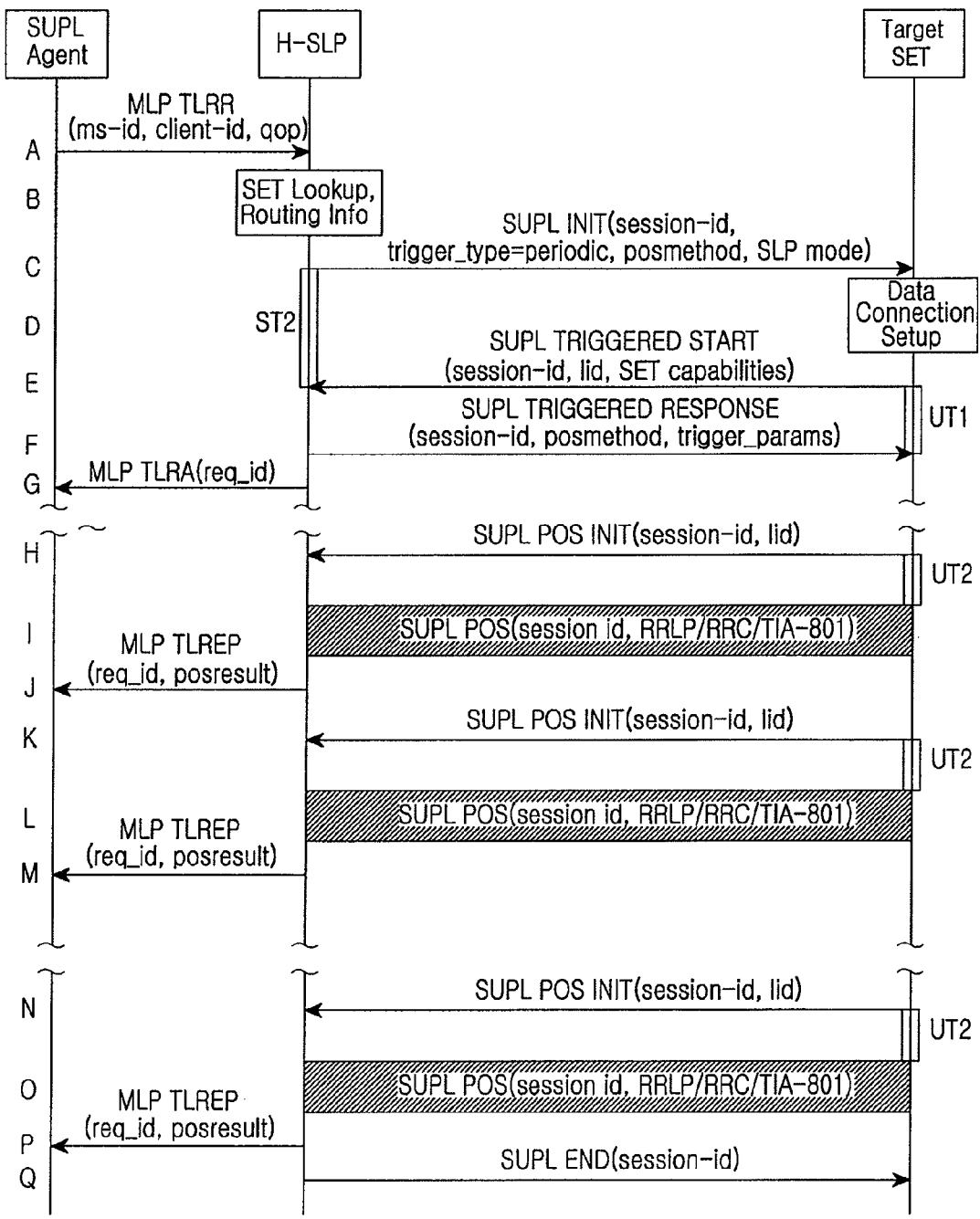
FIG. 1 is a flowchart illustrating an operating procedure of calculating a location value of a Target SET according to a conventional method for providing a location service.
Figure 2:
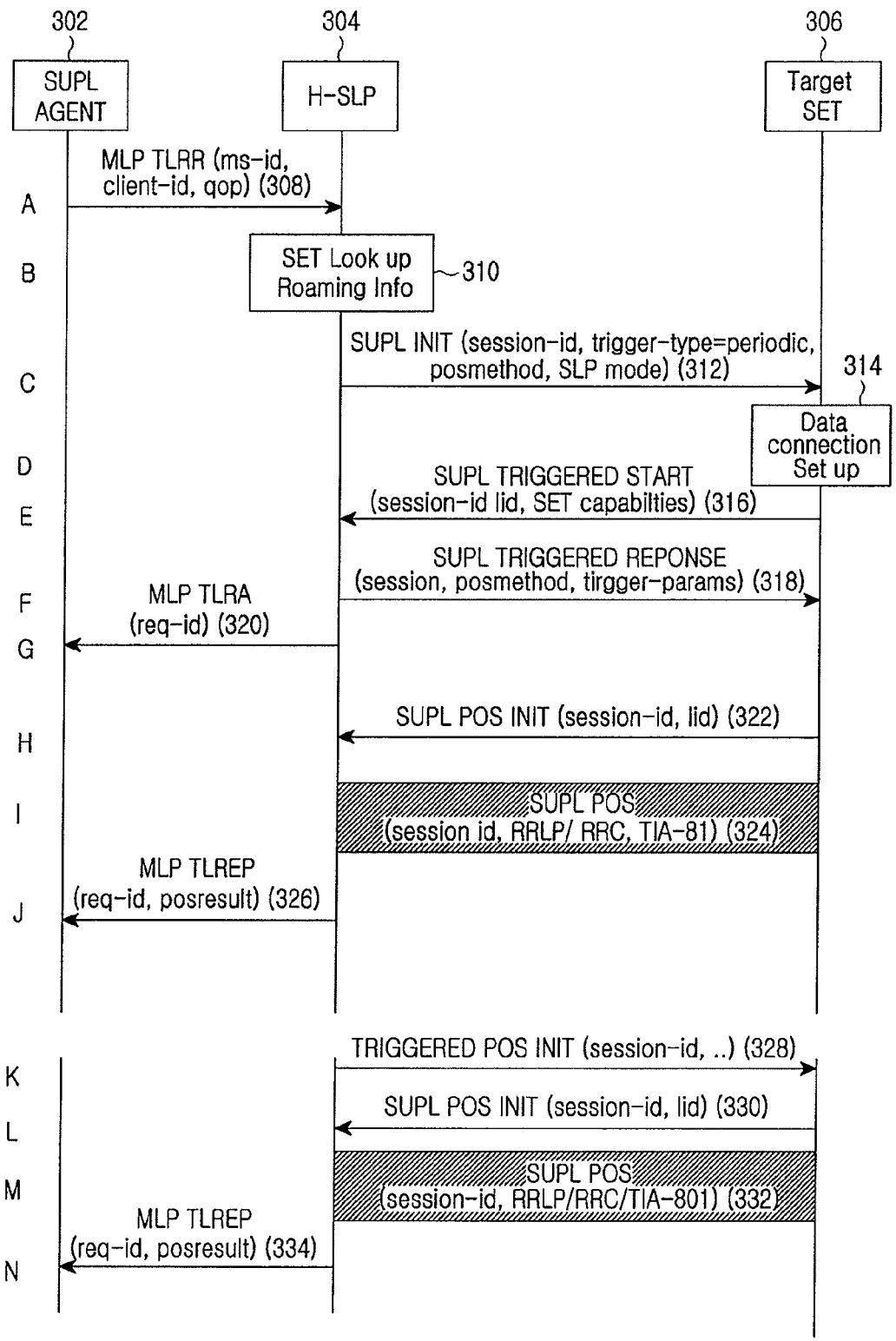
FIG. 2 is a flowchart illustrating that an H-SLP calculates a location value of a Target SET according to an exemplary embodiment of the present invention.

FIG. 2 is a flowchart illustrating that an H-SLP calculates the location value of the Target SET according to an exemplary embodiment of the present invention.

Referring to FIG. 2, the operating procedure in which the Target SET and the H-SLP check the corresponding period together and perform the triggered location service of the Target SET according to the exemplary embodiment of the present invention is as follows.

A. An SUPL AGENT 302 transmits a Mobile Location Protocol Triggered Location Request Report (MLP TLRR) to an H-SLP 304 in step 308. The H-SLP 304 examines a triggered location service authority of the SUPL AGENT 302 by using a client ID, and a SUBSCRIBER PRIVACY of the Target SET 306 by using a Mobile Subscriber Identity (MSID).

B. The H-SLP determines if the Target SET 306 is in a roaming state and if the Target SET 306 uses an SUPL protocol for the positioning in step 310.

C. The H-SLP 304 transmits a location service initiating message (SUPL INIT message) to the Target SET 306 and starts the triggered location service in step 312. At this time, the SUPL INIT message may be sent in a form of a WAP push or a SMS TRIGGER method. And the SUPL INIT message includes parameters such as a SESSION ID indicating a connection between the H-SLP 304 and the Target SET 306, TRIGGER-TYPE indicating a kind of the triggered location service, a POS METHOD indicating the positioning method, and an SLP MODE indicating a form of the H-SLP.

D. If the Target SET 306 receives the SUPL INIT message, it is connected to a data network in step 314.

E. The Target SET transmits an SUPL TRIGGERED START message in step 316. At this time, the SUPL TRIGGERED START message includes parameters such as the SESSION ID, a Location ID (LID) indicating a location of a network in which the Target SET currently exists, a SET-CAPABILITY indicating the positioning method of the Target SET or the like.

F. The H-SLP 304 transmits the SUPL TRIGGERED RESPONSE message, determines the positioning method, and transmits the criteria for the triggered location service to the Target SET 306 in step 318.

G. The H-SLP 304 transmits an MLP TLRA message to the SUPL AGENT 302 and reports the start of the requested triggered location service in step 320.

H. The Target SET 306 memorizes a period for the positioning and transmits an SUPL POS INIT message of starting the positioning in step 322. At this time, the message includes the LID as information on the network in which the Target SET exists.

I. The H-SLP 304 and the Target SET 306 perform the positioning in step 324.

J. The H-SLP 304 transmits a location value resulting from the positioning to the SUPL AGENT 302 in step 326.

K. In step 328, the H-SLP 304 determines if a triggered message of starting the positioning arrives the Target SET 306 within a specific time interval, i.e., a preset period. If the triggered message arrives the preset period, the steps of H, I and J are repeated. However, if the triggered message does not arrive within the specific time interval, i.e., the preset period, the H-SLP 304 transmits the positioning inducing message to the Target SET 306. At this time, the H-SLP 304 stores the corresponding period for every Target SET 306, and waits for the SUPL POS INIT message, i.e., the triggered message from the Target SET 306. If the SUPL POS INIT message does not arrive within the time interval set by the H-SLP 304 from the beginning of the preset period, the H-SLP 304 transmits the positioning start inducing message to the Target SET 306. Here, the H-SLP 304 stores the corresponding period for every Target SET 306 and waits for the SUPL POS INIT message, i.e., the TRIGGERED message from the Target SET 306. And, if the SUPL POS INIT message does not arrive within the time interval set by the H-SLP 304 from the beginning of the preset period, the H-SLP 304 transmits the positioning start inducing message to the Target SET 306.

L. In step 330, the Target SET 306 receives an SUPL TRIGGERED INIT message from the H-SLP 304 and transmits the SUPL POS INIT message to the H-SLP 304. The message includes the information on the network in which the Target SET currently exists, i.e., the LID necessary for the positioning. Even though the Target SET 306 fails to transmit the SUPL POS INIT message within the corresponding period due to a timer error or a turn-on after a power turns off, it can transmit the message for starting the positioning to the H-SLP 304.

M. The H-SLP 304 and the Target SET 306 perform the positioning in step 332.

N. The H-SLP 304 transmits the calculated location value to the SUPL AGENT 302 in step 334.

Figure 3:
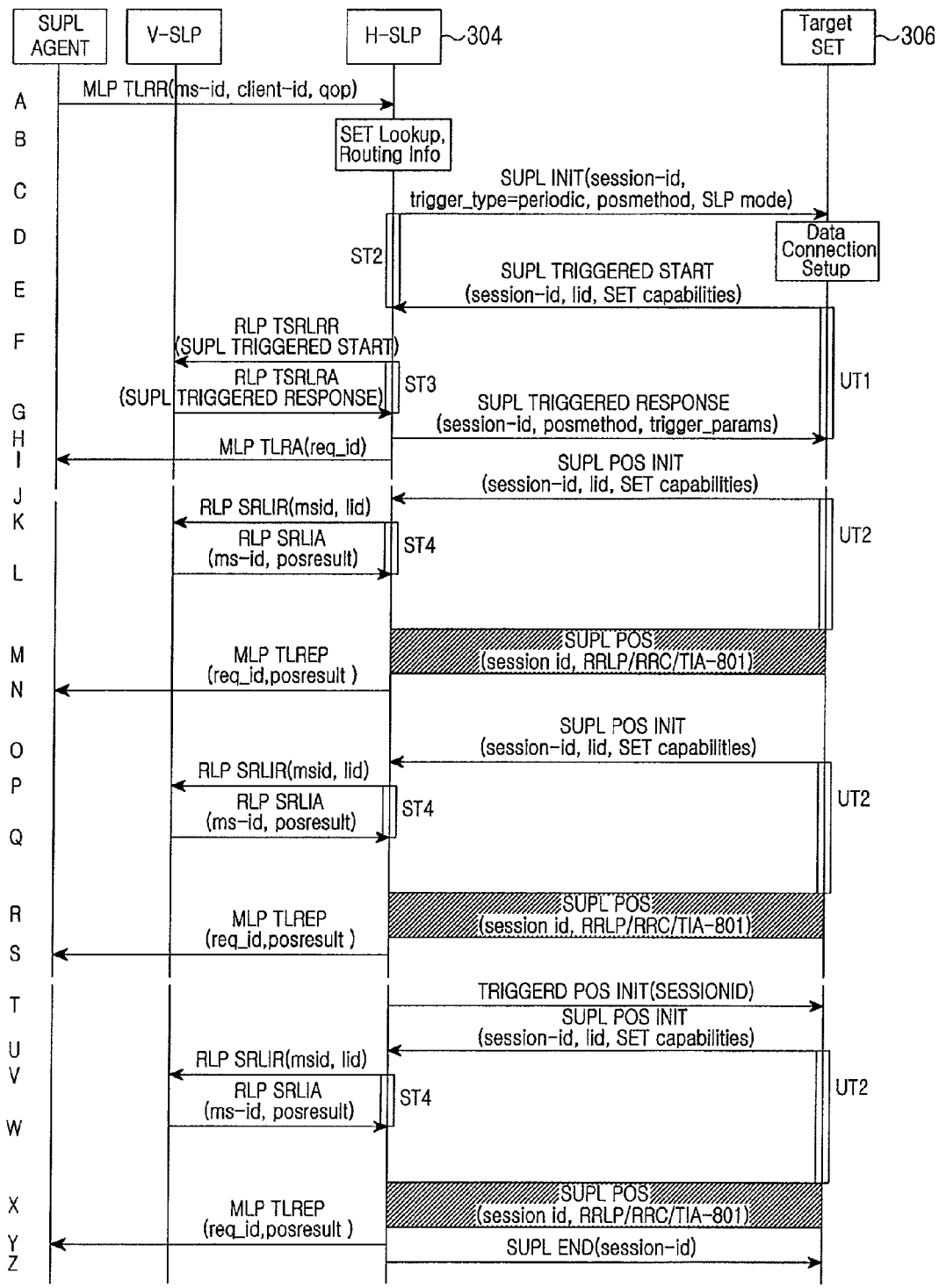
FIG. 3 is a flowchart illustrating that an H-SLP calculates a location value of a Target SET by receiving a help of from a visited location server (V-SLP) when the Target SET exists in a visited network according to an exemplary embodiment of the present invention.

FIG. 3 is a flowchart illustrating that an H-SLP calculates a location value of a Target SET by receiving a help of a V-SLP when the Target SET exists in a visited network according to an exemplary embodiment of the present invention.

A. An SUPL AGENT transmits an MLP TLRR to the H-SLP. The H-SLP examines a triggered location service authority of the SUPL AGENT by using the client ID, and the SUBSCRIBER PRIVACY of the Target SET 306 by using the MSID.

B. The H-SLP determines if the Target SET is in a roaming state. Further, the H-SLP determines if the Target SET uses an SUPL protocol for the positioning. If the Target SET is in a roaming state, the H-SLP selects the visited location server (V-SLP) included in the corresponding network.

C. The H-SLP transmits an SUPL INIT message to the Target SET and starts the triggered location service. At this time, the SUPL INIT message may be sent in forms of a WAP push or a SMS TRIGGER method. And the SUPL INIT message includes parameters such as a SESSION ID indicating a connection between the H-SLP and the Target SET, a TRIGGER-TYPE indicating a kind of the triggered location service, a POS METHOD indicating the positioning method and an SLP MODE indicating a form of the H-SLP.

D. If the Target SET receives the SUPL INIT message, it is connected to a data network.

E. The Target SET transmits an SUPL TRIGGERED START message. At this time, the SUPL TRIGGERED START message includes parameters such as the SESSION ID, an LID indicating a location of a network in which the Target SET currently exists, a SET-CAPABILITY indicating the positioning method of the Target SET or the like.

F. The H-SLP transmits the SUPL TRIGGERED START message received from the Target SET to the V-SLP.

G. The V-SLP transmits a message allowing a request for the corresponding location service to the H-SLP.

H. The H-SLP transmits an SUPL TRIGGERED response message received from the V-SLP. At this time, the V-SLP determines the positioning method and transmits the determined method together with the SUPL TRIGGERED response message to the Target SET.

I. The H-SLP transmits an MLP TLRA to the SUPL AGENT, and reports the start of the requested triggered location service.

J. The Target SET memorizes the period for the positioning and transmits an SUPL POS INIT message of starting the positioning to the H-SLP. At this time, the message includes the LID as information on the network in which the Target SET exists.

K. The H-SLP transmits the LID received from the Target SET to the V-SLP and requests for geographical location information indicated in corresponding information. At this time, the requested geographical location information denotes information of an approximate location of the Target SET. By using the information, the H-SLP selects position assistant data for transmitting to the Target SET, e.g., satellite information.

L. The V-SLP provides the H-SLP with the approximate location information (posresult).

M. The H-SLP and the Target SET perform the positioning.

N. The H-SLP transmits the calculated location value to the SUPL AGENT.

O. It is substantially identical to step J in FIG. 2.

P. It is substantially identical to step K in FIG. 2.

Q. It is substantially identical to step L in FIG. 2.

R. It is substantially identical to step M in FIG. 2.

S. It is substantially identical to step N in FIG. 2.

T. The H-SLP 304 determines if a triggered message of starting the positioning is received from the Target SET 306 within a specific time interval, i.e., the preset period. If the triggered message arrives within the preset period, steps P, Q, R and S are repeated. However, if the triggered message does not arrive within the specific time interval, i.e., the preset period, the H-SLP 304 transmits the positioning inducing message to the Target SET 306. At this time, the H-SLP 304 stores the corresponding period for every Target SET 306, and waits for the SUPL POS INIT message, i.e., the triggered message from the Target SET 306. If the SUPL POS INIT message does not arrive within the time period set by the H-SLP 304 from the beginning of the preset period, the H-SLP 304 transmits the positioning inducing message to the Target SET 306.

U. The Target SET 306 receives the SUPL TRIGGERED INIT message from the H-SLP 304 and transmits the SUPL POS INIT message to the H-SLP 304. The message includes the information on the network in which the target terminal currently exists, i.e., the LID necessary for the positioning. Even though the Target SET 306 fails to transmit the SUPL POS INIT message within the corresponding period due to a timer error or a turn-on after a power turns off, it can transmit the message for starting the positioning to the H-SLP 304.

V. to Y. They are substantially identical to steps P to S in FIG. 2.

If the triggered service is interrupted, the H-SLP transmits an SUPL END message to the Target SET and releases all sessions.

Figure 4:
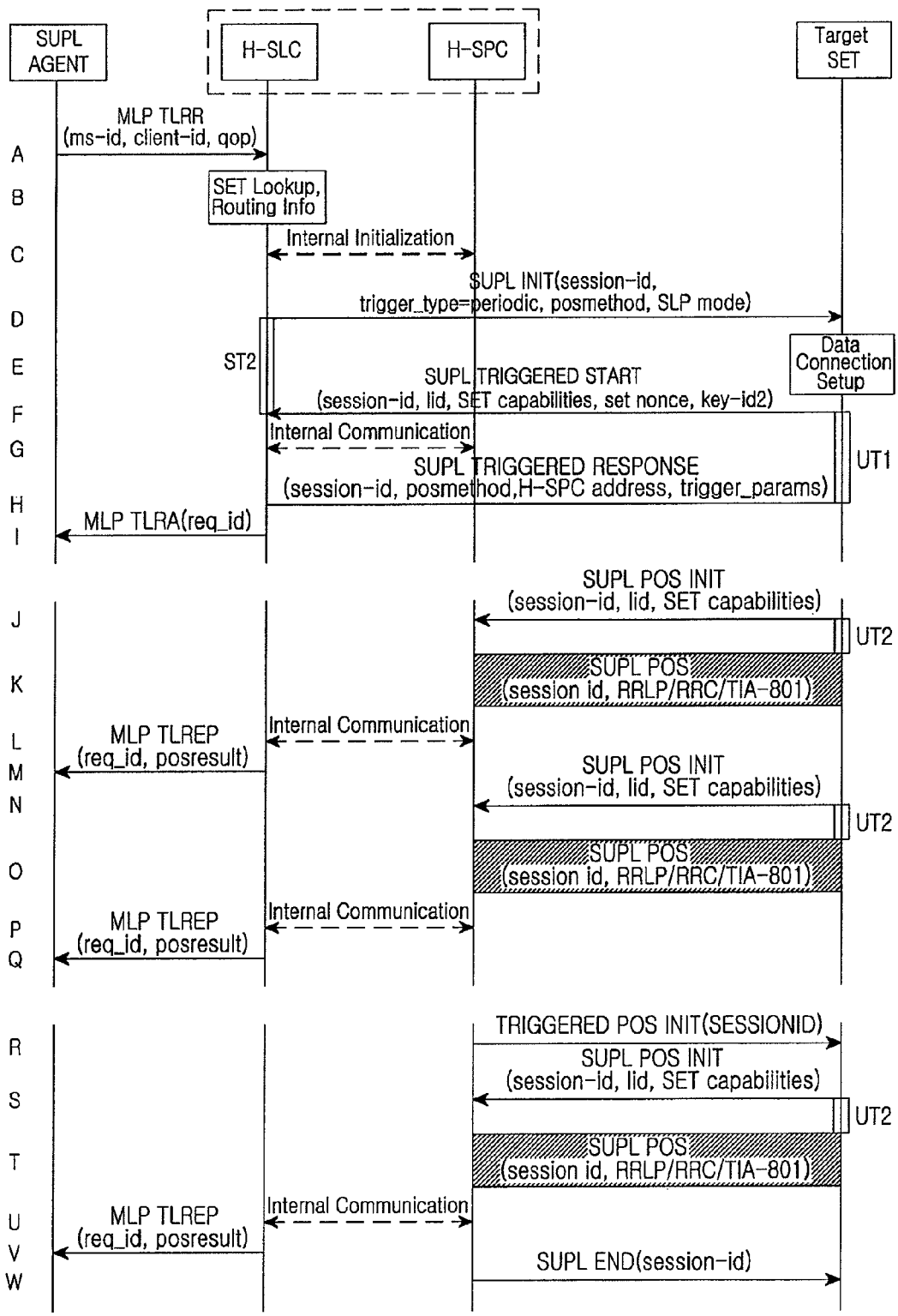
FIG. 4 is a flowchart illustrating an operating procedure of calculating the location value of a Target SET in case of a NETWORK INITIATED CASE in a time-periodic location service and when an H-SLP is divided into an SUPL Positioning Center (SPC) and an SUPL Location Center (SLC) according to an exemplary embodiment of the present invention.

FIG. 4 is a flowchart illustrating an operating procedure of calculating the location value of the Target SET in case of a NETWORK INITIATED CASE in a time-periodic location service and when the H-SLP is divided into an SUPL Positioning Center (SPC) and an SUPL Location Center (SLC) according to an exemplary embodiment of the present invention;

A. An SUPL AGENT transmits an MLP TLRR to a home SUPL Location Center (H-SLC) of the Target SET. The H-SLC checks a triggered location service authority of the SUPL AGENT by using the CLIENT ID and a SUBSCRIBER PRIVACY of the Target SET by using a MSID.

B. The H-SLC determines if the Target SET is in a roaming state, and if the Target SET performs the positioning by using an SUPL protocol.

C. The H-SLC and a home SUPL Positioning Center (H-SPC) exchange necessary information.

D. The H-SLC transmits the SUPL INIT message to the Target SET and starts the triggered location service. At this time, the SUPL INIT message may be sent in forms of a WAP push or a SMS TRIGGER method. And the SUPL INIT message includes parameters such as a SESSION ID indicating a connection between the H-SLP and the Target SET, a TRIGGER-TYPE indicating a kind of the triggered location service, a POS METHOD indicating the positioning method and an SLP MODE indicating a form of the H-SLP.

E. If the Target SET receives the SUPL INIT message, it is connected to a data network.

F. The Target SET 306 transmits an SUPL TRIGGERED START message. At this time, the SUPL TRIGGERED START message includes parameters such as the SESSION ID, a Location ID (LID) indicating information on a location of a network in which the Target SET currently exists, and a SET-CAPABILITY indicating the positioning method of the Target SET or the like.

G. The H-SLC and the H-SPC exchange necessary information.

H. The H-SLC transmits the SUPL TRIGGERED START message, determines the positioning method, and transmits criteria for the triggered location service to the Target SET. Further, the H-SLC transmits an address of the H-SPC and makes the Target SET to calculate the location value through directly connecting with the H-SPC.

I. The H-SLC transmits the MLP TLRA to the SUPL AGENT, and informs of the start of the requested triggered location service.

J. The Target SET memorizes the period for the positioning and transmits the SUPL POS INIT message for starting the positioning to the H-SPC. At this time, the message includes the LID as information on the network in which the Target SET exists. The H-SLP determines if the triggered message of starting the positioning is received from the Target SET within a specific time interval, i.e., a preset period.

K. The H-SPC and the Target Set 306 perform the positioning.

L. The H-SPC transmits a location value to the H-SLC.

M. The H-SLC transmits the calculated location value to the SUPL AGENT.

N. to Q. They are substantially identical to steps J, K, L and M in FIG. 2.

R. The H-SLP determines if the triggered message of starting the positioning is received from the Target SET within the specific time interval, i.e., the preset period. If the triggered message does not arrive within the specific time interval, i.e., the preset period, the H-SLP transmits the positioning inducing message to the Target SET. At this time, the H-SLP stores the corresponding period for every Target SET, and waits for the SUPL POS INIT message, i.e., the triggered message from the Target SET. If the SUPL POS INIT message does not arrive within the time interval set by the H-SLP from the beginning of the preset period, the H-SLP transmits the positioning inducing message to the Target SET 306.

S. The Target SET receives the SUPL TRIGGERED INIT message from the H-SLP and transmits the SUPL POS INIT message to the H-SLP. The message includes the information on the network in which the target terminal currently exists, i.e., the LID necessary for the positioning. Therefore, even though the Target SET fails to transmit the SUPL POS INIT message within the corresponding period due to a timer error or a turn-on after the power turns off, it can transmit the message for starting the positioning to the H-SLP.

T. to V. They are substantially identical to steps K to N in FIG. 2.

Figure 5:
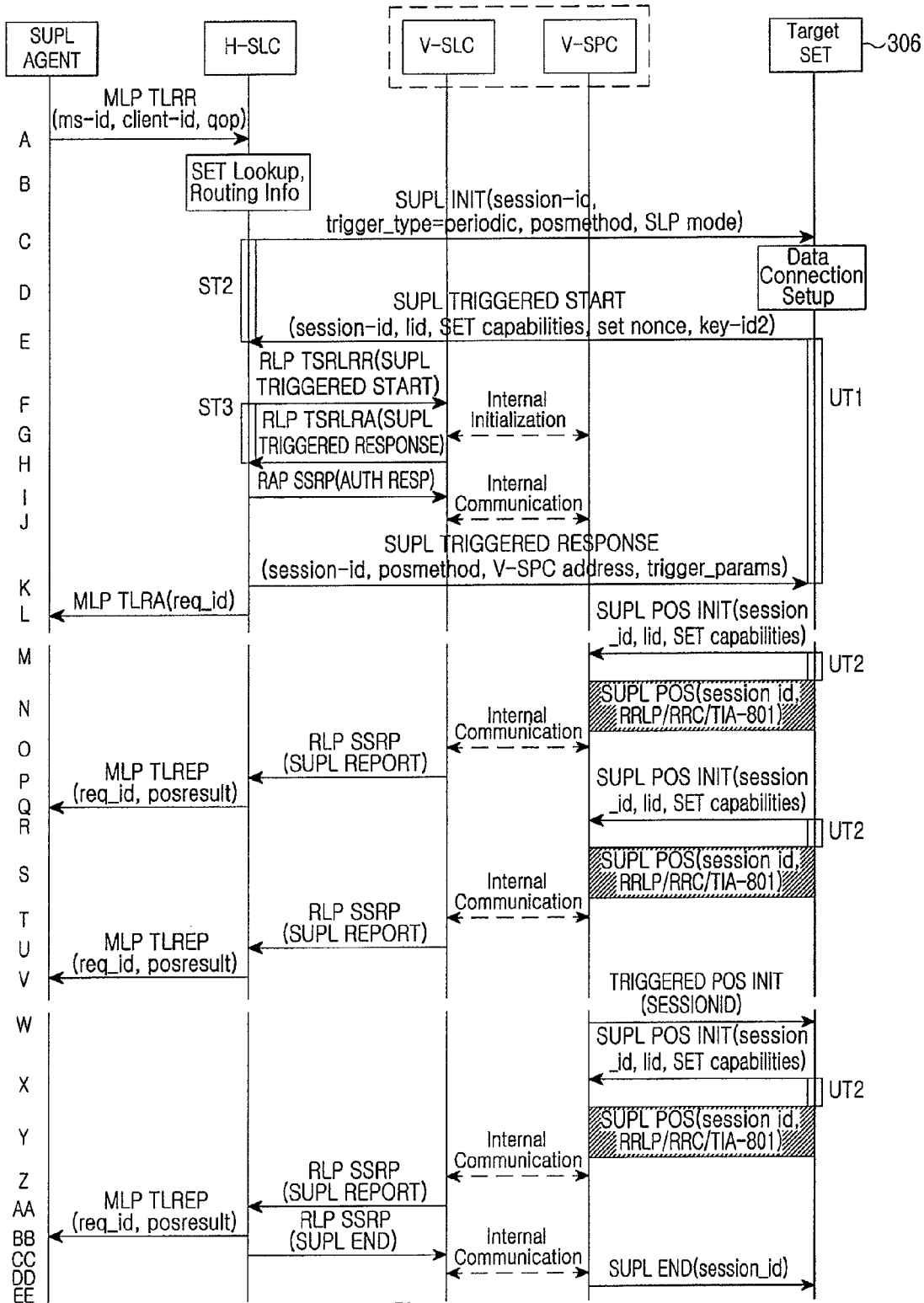
FIG. 5 is a flowchart illustrating an operating procedure of calculating the location value of the Target SET in case of the NETWORK INITIATED CASE in the time-periodic location service and the Target SET is in a roaming state and the H-SLP is divided into the SPC and the SLC according to an exemplary embodiment of the present invention.

FIG. 5 is a flowchart illustrating an operating procedure of calculating a location value of the Target SET in case of the NETWORK INITIATED CASE in a time-periodic location service and when the H-SLP is divided into a V-SPC and a V-SLC in a roaming state of the Target SET according to an exemplary embodiment of the present invention.

A. An SUPL AGENT transmits an MLP TLRR to the H-SLP. The H-SLP checks a triggered location service authority of the SUPL AGENT by using the CLIENT ID and a SUBSCRIBER PRIVACY of the Target SET 306 by using an MSID.

B. The H-SLP determines if the Target SET is in a roaming state, and if the Target SET performs the positioning by using the SUPL protocol. If the Target SET is in a roaming state, the H-SLP selects the V-SLP including in the corresponding network.

C. The H-SLP transmits the SUPL INIT message to the Target SET and starts the triggered location service. At this time, the SUPL INIT message may be sent in forms of a WAP push or a SMS TRIGGER method. And the SUPL INIT message includes parameters such as a SESSION ID indicating a connection between the H-SLP and the Target SET, a TRIGGER-TYPE indicating a kind of the triggered location service, a POS METHOD indicating the positioning method and an SLP MODE indicating a form of the H-SLP.

D. If the Target SET receives the SUPL INIT message, it is connected to a data network.

E. The Target SET transmits the SUPL TRIGGERED START message. At this time, the SUPL TRIGGERED START message includes a parameter such as the SESSION ID, the LID indicating the location of the network in which the Target SET currently exists, the SET-CAPABILITY indicating the positioning method of the Target SET or the like.

F. The H-SLP transmits the SUPL TRIGGERED START message received from the Target SET to the V-SLC.

G. The V-SLC and the V-SPC exchanges the necessary information.

H. The V-SLC transmits a message allowing a request for the corresponding location service to the H-SLP.

I. The H-SLP exchanges the message with the V-SLP.

J. The H-SLP transmits an SUPL TRIGGERED response message received from the V-SLC.

K. The V-SLP determines the positioning method and transmits it together with the SUPL TRIGGERED response message to the Target SET.

L. The H-SLP transmits the MLP TLRA to the SUPL AGENT, and reports the start of the requested triggered location service.

M. The Target SET memorizes the period for the positioning and transmits an SUPL POS INIT message for starting the positioning. At this time, the message includes the LID as information on the network in which the Target SET exists.

N. The H-SLP and the Target SET perform the positioning.

O. to Q. The H-SLP transmits the calculated location value to the SUPL AGENT.

R. to V. They are substantially identical to steps M to Q in FIG. 2.

W. If the triggered message does not arrive within the specific time interval from the Target SET 306, the V-SPC transmits the positioning inducing message to the Target SET. And, the V-SLP stores the corresponding period for every Target SET, and waits for the SUPL POS INIT message from the Target SET. If the SUPL POS INIT message does not arrive within the time period set by the H-SLP 304 from the beginning time of the preset period, the V-SLP transmits an SUPL TRIGGERED INIT message to the Target SET.

X. The Target SET receives the SUPL TRIGGERED INIT message from the V-SPC and transmits the SUPL POS INIT message to the V-SPC. Even though the Target SET fails to transmit the SUPL POS INIT message within the corresponding period due to the timer error or the turn-on after the power turns off, it can be performed the positioning of the Target SET 306. The SUPL TRIGGERED INIT message includes the information on the network in which the target terminal 306 currently exists, i.e., the LID necessary for the positioning.

Y. to EE. They are substantially identical to steps N to Q in FIG. 2.

Figure 6:
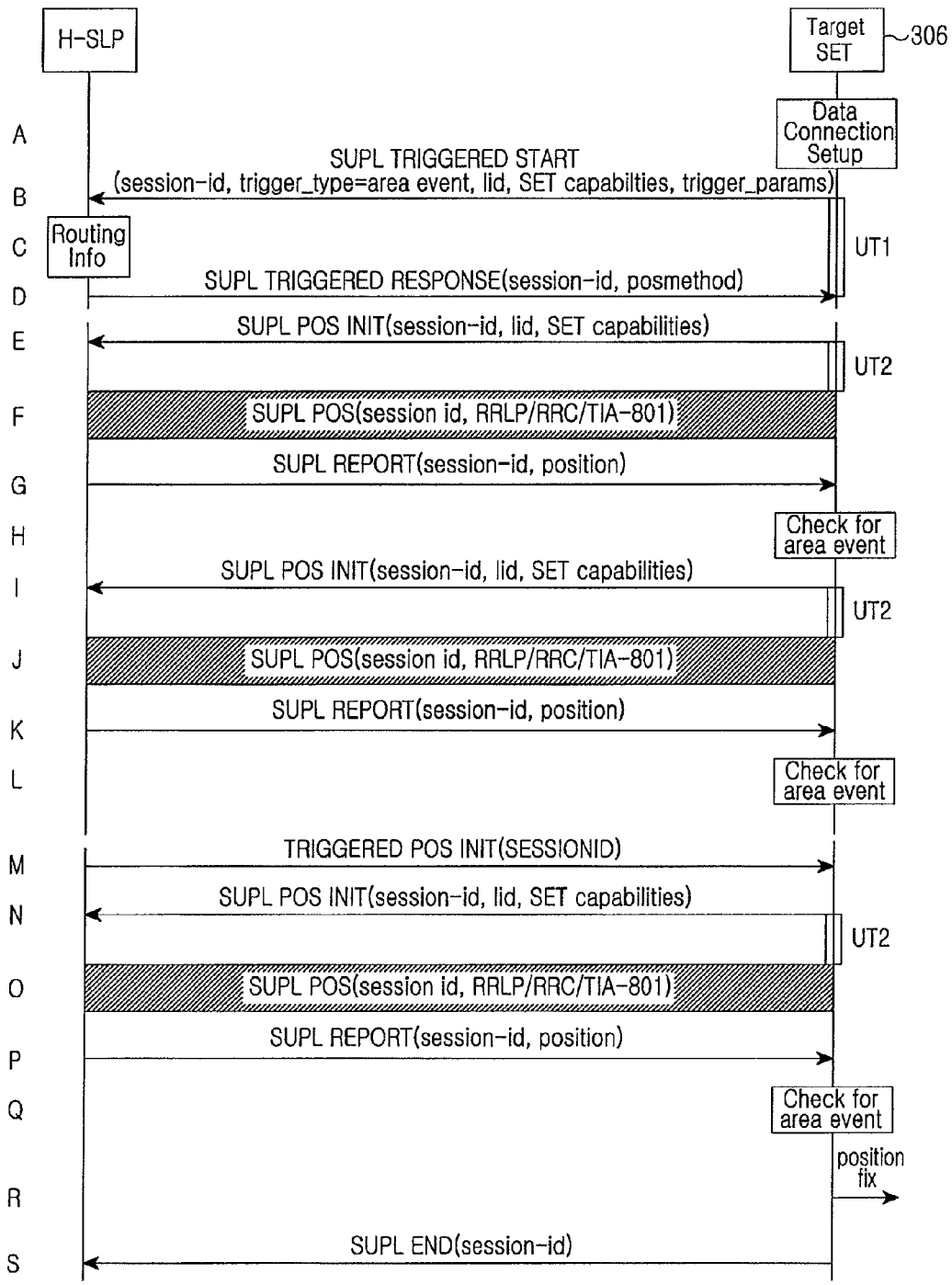
FIG. 6 is a flowchart illustrating an operating procedure of calculating the location value of a Target SET in case of a SET INITIATED CASE in a time-periodic location service according to an exemplary embodiment of the present invention.

FIG. 6 is a flowchart illustrating an operating procedure of calculating a location value of the Target SET in case of the SET INITIATED CASE according to an exemplary embodiment of the present invention. Here, it is assumed that the Target SET is included in the home network and the H-SLP is not separated, i.e., a proxy mode.

A. to B. The Target SET transmits the SUPL TRIGGERED START message to an H-SLP 304.

C. The H-SLP determines if the Target SET is in a roaming state, and if the Target SET performs the positioning by using an SUPL protocol.

D. The H-SLC transmits an SUPL TRIGGERED RESPONSE message, determines a positioning method, and then transmits the determined method together with criteria for the triggered location service to the Target SET.

E. The Target SET memorizes the period for the positioning and transmits an SUPL POS INIT message for the start of the positioning. At this time, the message includes an LID as information on the network in which the Target SET exists.

F. The H-SLP 304 and the Target SET 306 perform the positioning.

G. When the H-SLP calculates a location value, it transmits the calculated location value to the Target SET.

H. The Target SET determines an occurrence of an event based on the location value.

I. to L. They are substantially identical to steps E to H in FIG. 2.

M. The H-SLP determines if the triggered message of starting the positioning is received from the Target SET within a specific time interval, i.e., a preset period. If the triggered message does not arrive within the specific time interval, i.e., the preset period, the H-SLP transmits the positioning inducing message to the Target SET. At this time, the H-SLP stores the corresponding period for every Target SET, and waits for an SUPL POS INIT message, i.e., the triggered message from the Target SET. If the SUPL POS INIT message does not arrive within the time period set by the H-SLP from the beginning time of the preset period, the H-SLP transmits the positioning inducing message to the Target SET.

N. The Target SET receives the SUPL TRIGGERED INIT message from the H-SLP and transmits the SUPL POS INIT message to the H-SLP. The message includes the information on the network in which the target terminal currently exists, i.e., the LID necessary for the positioning. Therefore, even though the Target SET fails to transmit the SUPL POS INIT message within the corresponding period due to a timer error or a turn-on after a power turns off, it can transmit the message for starting the positioning to the H-SLP.

O. to R. They are substantially identical to steps F to H in FIG. 2.

Figure 7:
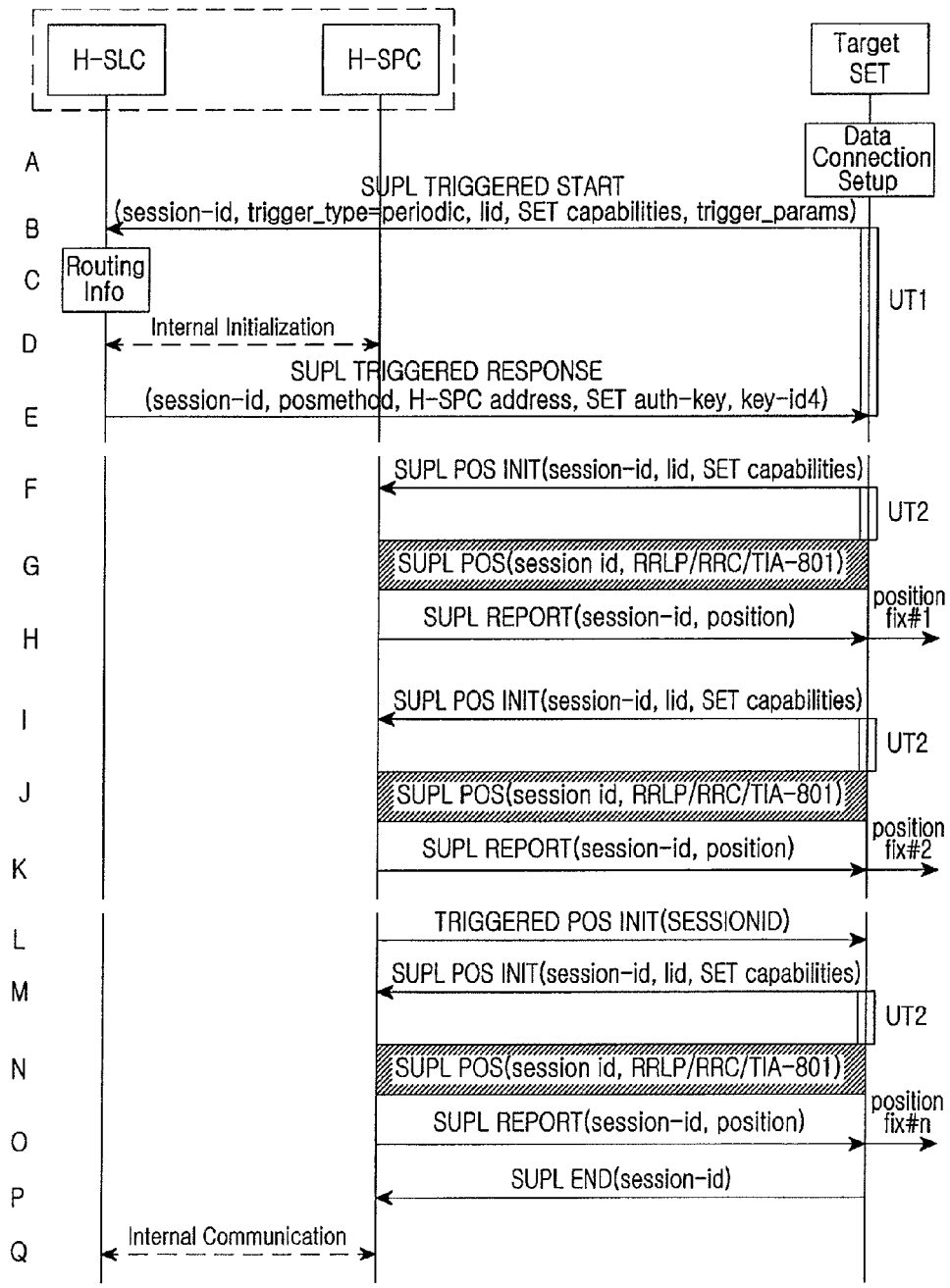
FIG. 7 is a flowchart illustrating an operating procedure of calculating the location value of the Target SET in case of the SET INITIATED CASE in the time-periodic location service and when an H-SLP is divided into the SPC and the SLC according to an exemplary embodiment of the present invention.

FIG. 7 is a flowchart illustrating an operating procedure of calculating a location value of the Target SET in case of the SET INITIATED CASE in a time-periodic location service and when the H-SLP is divided into the SPC and the SLC according to an exemplary embodiment of the present invention.

A. to B. The Target SET transmits an SUPL TRIGGERED START message to an H-SLC.

C. The H-SLC determines if the Target SET is in a roaming state, and if the Target SET performs the positioning by using an SUPL protocol.

D. The H-SLC and an H-SPC internally exchange a message.

E. The H-SLC transmits an SUPL TRIGGERED RESPONSE message, determines a positioning method, and transmits criteria for the triggered location service to the Target SET.

F. The Target SET memorizes the period for the positioning and transmits the SUPL POS INIT message for the start of the positioning. At this time, the message includes an LID as information on the network in which the Target SET exists.

G. The H-SLP and the Target SET perform the positioning.

H. When the H-SLP calculates a location value, it transmits the calculated location value to the Target SET.

I. to K. They are substantially identical to steps F to H in FIG. 2.

L. The H-SLP determines if the triggered message of starting the positioning is received from the Target SET within a specific time interval, i.e., the preset period. If the triggered message does not arrive within the specific time interval, i.e., the preset period, the H-SLP transmits a positioning inducing message to the Target SET. At this time, the H-SLP stores the corresponding period for every Target SET, and waits for the SUPL POS INIT message, i.e., the triggered message from the Target SET. If the SUPL POS INIT message does not arrive within the time period set by the H-SLP from the beginning time of the preset period, the H-SLP transmits the positioning inducing message to the Target SET.

M. The Target SET receives the SUPL TRIGGERED INIT message from the H-SLP and transmits the SUPL POS INIT message to the H-SLP. The message includes the information on the network in which the target terminal currently exists, i.e., the LID necessary for the positioning. Therefore, even though the Target SET fails to transmit the SUPL POS INIT message within the corresponding period due to a timer error or a turn-on after a power turns off, it can transmit the message for starting the positioning to the H-SLP.

N. to O. They are substantially identical to steps G to H in FIG. 2.

Figure 8:
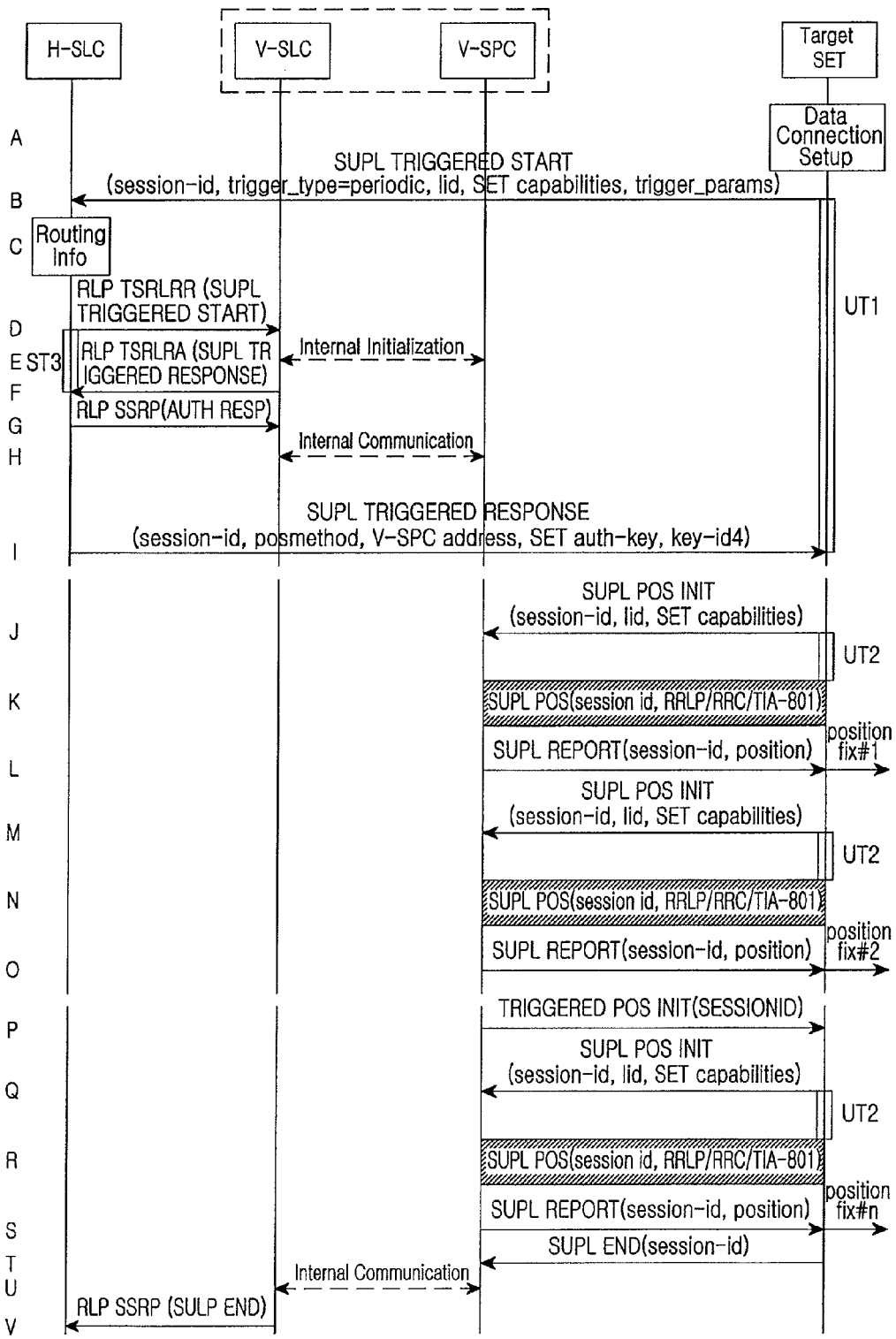
FIG. 8 is a flowchart illustrating an operating procedure of calculating the location value of a Target SET in case of the SET INITIATED CASE in a time-periodic location service and when the Target SET is in a roaming state and the H-SLP is divided into the SPC and the SLC according to an exemplary embodiment of the present invention.

FIG. 8 is a flowchart illustrating an operating procedure of calculating a location value of the Target SET in case of the SET INITIATED CASE in a time-periodic location service and when the H-SLP is divided into the SPC and the SLC in a roaming state of the Target SET according to an exemplary embodiment of the present invention.

A. to B. The Target SET transmits an SUPL TRIGGERED START message to an H-SLC.

C. The H-SLC determines if the Target SET is in a roaming state, and if the Target SET performs the positioning by using an SUPL protocol.

D. The H-SLP transmits the SUPL TRIGGERED START message received from the Target SET to the V-SLC.

E. The V-SLC and V-SPC internally exchange a message.

F. The V-SLC transmits the message allowing a request for the corresponding location service to the H-SLP.

G. to H. The H-SLP and the V-SLP exchanges the message.

I. The H-SPC transmits the SUPL TRIGGERED START message transmitted from the V-SLC. At this time, the V-SLP determines the positioning method and transmits the determined method together with the SUPL TRIGGERED RESPONSE message to the Target SET.

J. The Target SET memorizes the period for the positioning and transmits the SUPL POS INIT message of starting the positioning. At this time, the message includes an LID as information on the network in which the Target SET exists.

K. The H-SLP and the Target SET perform the positioning.

M. When the H-SLP calculates a location value, it transmits the calculated location value to the Target SET.

N. to O. They are substantially identical to steps J to L in FIG. 2.

P. If the triggered message does not arrive within a specific time interval, i.e., a preset period, the V-SPC transmits the positioning inducing message to the Target SET. At this time, the V-SPC stores the corresponding period for every Target SET, and waits for the SUPL POS INIT message from the Target SET. If the SUPL POS INIT message does not arrive within the time interval set by the H-SLP from the beginning of the preset period, the H-SLP transmits the positioning inducing message.

Q. Even though the Target SET fails to transmit the SUPL POS INIT message within the corresponding period due to a timer error or a turn-on after a power turns off, it can receive the SUPL TRIGGERED INIT message from the V-SPC and transmit the SUPL POS INIT message to the V-SPC. The message includes the LID as information on the network in which the Target SET exists.

R. to S. They are substantially identical to steps N to O in FIG. 2.

In the triggered location service which continuously performs the positioning according to the present invention, if the target SET fails to transmit the message for starting the positioning within the predetermined period interval in such that the positioning is not started within the specific time interval from the beginning of the corresponding period, the H-SLP also simultaneously checks the period so that the H-SLP transmits the positioning inducing message to the target SET.

In the prior art, the only target SET checks the period in which the positioning is performed. However, when the Target SET incorrectly checks the corresponding positioning period due to the timer error or the turn-on after the power turns off, the Target SET does not transmit the positioning initiating message to the H-SLP. Accordingly, the Target SET and the H-SLP cannot perform the positioning in the period, and which causes the failure of calculating the location value so that there arises a problem in the triggered location service. According to the present invention, the H-SLP checks the period for the positioning as well. Accordingly, if the message reporting the start of the positioning from the target SET does not arrive within the specific period from the beginning of the corresponding period, the H-SLP transmits the positioning inducing message to the Target SET. Therefore, there is a complementary effect on that the positioning can be performed in the preset period.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a location value of a Target Secure User Plane Location (SUPL) Enabled Terminal (SET) (Target SET) according to a request of a Secure User Plane Location AGENT (SUPL AGENT) in a location information providing system, the method comprising:

(1) exchanging a location service initiating message (SUPL INIT message) and a triggered location service start message (SUPL TRIGGERED START message) by a location server (H-SLP) and the Target SET, and obtaining a positioning method and criteria for the triggered location service and starting the triggered location service by the Target SET;
(2) determining if the H-SLP receives the SUPL INIT message for starting positioning from the Target SET within a specific period by the H-SLP;
(3) transmitting a positioning start inducing message to the Target SET by the H-SLP when the SUPL INIT message does not arrive the Target SET;
(4) receiving the positioning start inducing message and transmitting the SUPL INIT START message to the H-SLP by the Target SET;
(5) performing the positioning by the H-SLP and the Target SET; and
(6) transmitting a location value resulting from the positioning to the SUPL AGENT by the H-SLP.

2. The method as claimed in claim 1, wherein the SUPL TRIGGERED START message comprises at least one of a SESSION ID, a Location ID (LID) indicating a location of a network in which the Target SET currently exists, and a SET-CAPABILITY indicating the positioning method of the Target SET.

3. The method as claimed in claim 1, wherein the positioning start inducing message comprises a LID indicating information on the network in which the Target SET currently exists.

4. The method as claimed in claim 1, wherein the step (1) exchanging of the SUPL INIT message and the SUPL TRIGGERED START message comprises:
(a) transmitting the SUPL INIT message to the Target SET by using a WAP PUSH method or a Short Message Service (SMS) TRIGGER method by the H-SLP;
(b) connecting to the H-SLP through a data network by the Target SET when the SUPL INIT message is received;
(c) transmitting the SUPL TRIGGERED START message to the H-SLP by the Target SET; and
(d) determining the positioning method when the SUPL TRIGGERED START message is received, and transmitting the determined positioning method and the criteria for the triggered location service to the Target SET by the H-SLP.

5. The method as claimed in claim 1, wherein the location information system calculates the location value of the Target SET by using an SUPL protocol.

6. A method for providing a location value of a Target SET according to a request of an SUPL AGENT in a location information providing system, the method comprising:
(1) determining if the Target SET is in a roaming state, and selecting a visited location server (V-SLP) included in a corresponding network when the Target SET is in the roaming state by an H-SLP;
(2) transmitting an SUPL INIT message to the Target SET and starting a triggered location service by the H-SLP;
(3) transmitting an SUPL TRIGGERED START message to the H-SLP by the Target SET;
(4) transmitting the SUPL TRIGGERED START message to the V-SLP by the H-SLP;
(5) transmitting a message allowing a request for a corresponding triggered location service to the H-SLP by the V-SLP;
(6) transmitting the message allowing the request for the triggered location service received from the V-SLP by the H-SLP;
(7) determining a positioning method and transmitting the determined positioning method to the Target SET together with a response message of a triggered location request by the V-SLP;
(8) memorizing a period for performing the positioning and transmitting by the period the SUPL POS INIT message including information on the network in which the Target SET exists by the Target SET.
(9) transmitting the network information to the V-SLP, requesting for geographical location information indicated in the corresponding information and selecting location assistant data for transmitting to the Target SET by the H-SLP;
(10) providing the H-SLP with an approximate location information (posresult) by the V-SLP;
(11) performing the positioning by the H-SLP and the Target SET;
(12) determining if the SUPL POS INIT for starting the positioning arrives from the Target SET within the specific period by the H-SLP;
(13) transmitting a positioning start inducing message to the Target SET by the H-SLP when the SUPL POS INIT message does not arrive the Target SET;
(14) receiving the positioning start inducing message and transmitting the SUPL POS INIT message to the H-SLP by the Target SET;
(15) performing the positioning by the H-SLP and the Target SET; and
(16) transmitting a location value resulting from the positioning to the SUPL AGENT by the H-SLP.

7. The method as claimed in claim 6, wherein the SUPL TRIGGERED START message comprises at least one of a SESSION ID, a Location ID (LID) indicating a location of a network in which the Target SET currently exists, and a SET-CAPABILITY indicating the positioning method of the Target SET.

8. The method as claimed in claim 6, wherein the positioning start inducing message comprises a LID indicating information on the network in which the Target SET currently exists.

9. The method as claimed in claim 6, wherein the location information system calculates the location value of the Target SET by using an SUPL protocol.

10. A method for providing a location value of a Target SET according to a request of an SUPL AGENT in a location information providing system, the method comprising:
(1) examining a triggered location service authority of the SUPL AGENT using a CLIENT ID and a SUBSCRIBER PRIVACY by using a Mobile Subscriber Identity (MSID) by an H-SUPL Location Center (SLC) of an H-SLP;
(2) exchanging necessary information between the H-SLC and an H-SUPL Positioning Center (SPC) of the H-SLP;
(3) transmitting an SUPL INIT message to the Target SET and starting the triggered location service by the H-SLC;
(4) transmitting an SUPL TRIGGERED START message to the H-SLC by the Target SET;
(5) exchanging necessary information between the H-SLC and the H-SPC;
(6) transmitting the SUPL TRIGGERED START message, determining a positioning method, transmitting criteria for the triggered location service to the Target SET and transmitting an address of the H-SPC by the H-SLC so that the Target SET directly connects to the H-SPC and calculates a location value;
(7) memorizing a period for the positioning and transmitting by the period the SUPL POS INIT message of starting the positioning together with information on a network in which the Target SET exists to the H-SPC by the Target SET;

(8) determining if a SUPL POS INIT message of starting the positioning arrives from the Target SET within a predetermined period by the H-SLP;

(9) transmitting a positioning start inducing message to the Target SET by the H-SLP when the SUPL POS INIT message does not arrive from the Target SET;

(10) receiving the positioning start inducing message and transmitting the SUPL POS INIT message to the H-SLP by the Target SET;

(11) performing the positioning by the H-SLP and the Target SET; and

(12) transmitting a location value resulting from the positioning to the SUPL AGENT by the H-SLR.

11. The method as claimed in claim 10, wherein the SUPL TRIGGERED START message comprises at least one of a SESSION ID, an LID indicating a location of a network in which the Target SET currently exists, and a SET-CAPABILITY indicating the positioning method of the Target SET.

12. The method as claimed in claim 10, wherein the positioning start inducing message comprises a LID indicating information on the network in which the Target SET currently exists.

13. The method as claimed in claim 10, wherein the location information system calculates the location value of the Target SET by using an SUPL protocol.

14. A method for providing a location value of a Target SET according to a request of an SUPL AGENT in a location information providing system, the method comprising:

(1) determining if the Target SET is in a roaming state and selecting a V-SLP included in a corresponding network when the Target SET is in a roaming state by the H-SLP;

(2) transmitting an SUPL INIT message to the Target SET and starting a triggered location service by the H-SLP;

(3) transmitting an SUPL TRIGGERED START message to the H-SLP by the Target SET;

(4) transmitting the SUPL TRIGGERED START message received from the Target SET to a V-SLC of a V-SLP by the H-SLP;

(5) exchanging necessary information between the V-SLC and a V-SPC of the V-SLP;

(6) transmitting a message allowing a corresponding location service request to the H-SLP by the V-SLC;

(7) transmitting the message allowing the location service request by the H-SLP;

(8) determining a positioning method and transmitting the determined method together with the allowance message of the location service request to the Target SET by the V-SLP;

(9) memorizing a period for the positioning and transmitting the SUPL INIT message of starting the positioning together with the information on the network in which the Target SET exists by the Target SET;

(10) performing the positioning by the H-SLP and the Target SET;

(11) transmitting a positioning start inducing message to the Target SET by the V-SLP if the SUPL TRIGGERED START message does not arrive from the Target SET within a specific time interval;

(12) storing a corresponding period for every Target SET and transmitting a positioning start inducing message to the Target SET by the V-SLP when the SUPL INIT message does not arrive within the corresponding period from the Target SET;

(13) receiving the positioning start inducing message from the V-SLP and transmitting the SUPL INIT message to the V-SLP by the Target SET;

(14) performing the positioning by the V-SLP and the Target SET; and

(15) transmitting a location value resulting from the positioning to the SUPL AGENT through the H-SLP by the V-SLP.

15. The method as claimed in claim 14, wherein the SUPL TRIGGERED START message comprises at least one of a SESSION ID, an LID indicating a location of a network in which the Target SET currently exists, and a SET-CAPABILITY indicating the positioning method of the Target SET.

16. The method as claimed in claim 14, wherein the location information system calculates the location value of the Target SET by using an SUPL protocol.

17. A method for providing a location value of a Target SET according to a request of an SUPL AGENT in a location information providing system, the method comprising:

(1) transmitting a triggered location service message to an H-SLP by the Target SET;

(2) determining a positioning method and transmitting the determined positioning method and the criteria for the triggered location service to the Target SET by the H-SLP;

(3) memorizing a period for performing the positioning and transmitting by the period a SUPL POS INIT message of starting the positioning together with an LID as information on a network in which the Target SET exists by the Target SET;

(4) performing the positioning by the H-SLP and the Target SET;

(5) determining if a SUPL POS INIT message for starting the positioning is received from the Target SET within a specific period by the H-SLP;

(6) transmitting a positioning start inducing message to the Target SET by the H-SLP when the SUPL POS INIT message does not arrive the Target SET;

(7) receiving the positioning start inducing message and transmitting the SUPL POS INIT message to the H-SLP by the Target SET;

(8) performing the positioning by the H-SLP and the Target SET; and (9) transmitting a calculated location value to the SUPL AGENT by the H-SLP.

18. The method as claimed in claim 17, wherein the SUPL TRIGGERED START message comprises at least one of a SESSION ID, an LID indicating a location of a network in which the Target SET currently exists, and a SET-CAPABILITY indicating the positioning method of the Target SET.

19. The method as claimed in claim 17, wherein the location information system calculates the location value of the Target SET by using an SUPL protocol.

20. A method for providing a location value of a Target SET according to a request of an SUPL AGENT in a location information providing system, the method comprising:

(1) transmitting a triggered location service message of an H-SLC of an H-SLP by the Target SET;

(2) exchanging the message internally between the H-SLC and an H-SPC;

(3) determining a positioning method and transmitting the determined positioning method and criteria for the triggered location service to the Target SET by the H-SLP;

(4) memorizing a period for performing the positioning and transmitting by the period an SUPL POS INIT message of starting the positioning together with information on a network in which the Target SET exists by the Target SET;

(5) performing the positioning by the H-SLP and the Target SET;

(6) determining if a SUPL POS INIT message for starting the positioning is received from the Target SET within a specific period by the H-SLP;

(7) transmitting a positioning start inducing message to the Target SET by the H-SLP when the SUPL POS INIT message does not arrive the Target SET;

(8) receiving the positioning start inducing message and transmitting the SUPL INIT message to the H-SLP by the Target SET;

(9) performing the positioning by the H-SLP and the Target SET; and

(10) transmitting a location value resulting from the positioning to the SUPL AGENT by the H-SLP.

21. The method as claimed in claim 20, wherein the SUPL TRIGGERED START message comprises at least one of a SESSION ID, an LID indicating a location of a network in which the Target SET currently exists, and a SET-CAPABILITY indicating the positioning method of the Target SET.

22. The method as claimed in claim 20, wherein the location information system calculates the location value of the Target SET by using an SUPL protocol.

23. A method for providing a location value of a Target SET according to a request of a an SUPL AGENT in a location information providing system, the method comprising:

(1) transmitting an SUPL TRIGGERED START message to an H-SLC of an H-SLP by the Target SET;

(2) transmitting the SUPL TRIGGERED START message transmitted from the Target SET to the H-SLC by the H-SLP;

(3) transmitting the SUPL TRIGGERED START message transmitted from the Target SET to a V-SLC of a V-SLP by the H-SLP;

(4) exchanging necessary information between the V-SLC and a V-SPC of the V-SLP;

(5) transmitting a message allowing a corresponding location service request to the H-SLP by the V-SLC;

(6) exchanging the message between the H-SLP and the V-SLP;

(7) determining a positioning method and transmitting the determined positioning method to the Target SET by the H-SLP;

(8) memorizing a period for the positioning and by the period transmitting an SUPL Positioning Initiating message (SUPL POS INIT message) of starting the positioning together with information on a network in which the Target SET exists;

(9) performing the positioning by the H-SLP and the Target SET;

(10) transmitting a positioning start inducing message to the Target SET by the V-SLP when a triggered message of starting the positioning does not arrive from the Target SET within a specific time interval;

(11) storing a corresponding period for every Target SET and transmitting the positioning start inducing message to the Target SET when an SUPL TRIGGERED START message does not arrive within the corresponding period from the Target SET by the V-SLP;

(12) receiving the positioning start inducing message from the V-SLP and transmitting the SUPL TRIGGERED START message to the V-SLP by the Target SET;

(13) performing the positioning by the V-SLP and the Target SET; and

(14) transmitting a location value resulting from the positioning to the SUPL AGENT through the H-SLP by the V-SLP.

* * * * *